(12) United States Patent
Hightower

(10) Patent No.: US 10,157,311 B2
(45) Date of Patent: Dec. 18, 2018

(54) DETECTING ARROWS WITHIN IMAGES

(71) Applicant: Konica Minolta Laboratory U.S.A., Inc., San Mateo, CA (US)

(72) Inventor: Ron Hightower, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 227 days.

(21) Appl. No.: 15/253,283

(22) Filed: Aug. 31, 2016

(65) Prior Publication Data

US 2018/0060654 A1 Mar. 1, 2018

(51) Int. Cl.
G06K 9/00 (2006.01)
G06K 9/46 (2006.01)
G06T 11/20 (2006.01)

(52) U.S. Cl.
CPC ..... *G06K 9/00416* (2013.01); *G06K 9/00429* (2013.01); *G06K 9/4638* (2013.01); *G06T 11/203* (2013.01)

(58) Field of Classification Search
None
See application file for complete search history.

(56) References Cited

U.S. PATENT DOCUMENTS

| 7,324,691 B2 | 1/2008 | Li et al. | |
| 2005/0063592 A1* | 3/2005 | Li | G06K 9/00476 382/181 |
| 2015/0346995 A1* | 12/2015 | Sugiura | G06F 3/04883 715/863 |

OTHER PUBLICATIONS

Xiang Bai et al., "Integrating Contour and Skeleton for Shape Classification", IEEE Workshop on NORDIA (in conjunction with ICCV), Kyoto, Japan, 2009 (8 pages).
Cagri Aslan et al., "An Axis-Based Representation for Recognition", in ICCV (2005); 1339-1346 (8 pages).

\* cited by examiner

*Primary Examiner* — Sumati Lefkowitz
*Assistant Examiner* — David Perlman
(74) *Attorney, Agent, or Firm* — Osha Liang LLP

(57) ABSTRACT

A method for processing an image with a processor, including: identifying, within an image, a candidate arrow including a long path adjacent to a plurality of short paths; determining a direction of the candidate arrow based on the long path; estimating a tip pixel within the plurality of short paths based on the direction of the candidate arrow; determining, for the candidate arrow, a plurality of arrowhead edges in the plurality of short paths based on the tip pixel; and generating, for the candidate arrow, a plurality of refined arrowhead edges based on the plurality of arrowhead edges, the direction, and the tip pixel.

20 Claims, 11 Drawing Sheets

DETECTING ARROWS WITHIN IMAGES

BACKGROUND

Writing boards such as whiteboards and blackboards are frequently used in many different settings (e.g., academic, corporate, non-profit, residential, etc.). Various content including text, drawings, arrows, tables, charts, and graphs may be drawn or placed on the writing boards for lectures, training, brainstorming sessions, etc. Additionally or alternatively, similar content may be hand-drawn on a sheet of paper.

In order to electronically memorialize these ideas, a photograph of the writing board may be taken or a scan of the sheet of paper may be executed. Further, image processing such as optical character recognition (OCR), stroke recognition, and reconstruction may be executed to extract the contents of the image (i.e., the photograph, the scan, etc.).

Although computer recognition of large shapes like ovals and rectangles in the image is relatively easy, computer recognition of hand-drawn arrows is particularly difficult, mainly because arrowheads are drawn with a variety of styles. Regardless, users still wish to convert the image including arrows into an electronically editable format.

SUMMARY

In general, in one aspect, the invention relates to a method for processing an image with a processor. The method comprises: identifying, within an image, a candidate arrow comprising a long path adjacent to a plurality of short paths; determining a direction of the candidate arrow based on the long path; estimating a tip pixel within the plurality of short paths based on the direction of the candidate arrow; determining, for the candidate arrow, a plurality of arrowhead edges in the plurality of short paths based on the tip pixel; and generating, for the candidate arrow, a plurality of refined arrowhead edges based on the plurality of arrowhead edges, the direction, and the tip pixel.

In general, in one aspect, the invention relates to a non-transitory computer readable medium (CRM) storing computer readable program code. The computer readable program code, when executed by a processor: identifies, within an image, a candidate arrow comprising a long path adjacent to a plurality of short paths; determines a direction of the candidate arrow based on the long paths; estimates a tip pixel within the plurality of short paths based on the direction of the candidate arrow; determines, for the candidate arrow, a plurality of arrowhead edges in the plurality of short paths based on the tip pixel; and generates, for the candidate arrow, a plurality of refined arrowhead edges based on the plurality of arrowhead edges, the direction, and the tip pixel.

In general, in one aspect, the invention relates to an image processing apparatus. The image processing apparatus comprises: a memory; and a processor that: identifies, within an image, a candidate arrow comprising a long path adjacent to a plurality of short paths; determines a direction of the candidate arrow based on the long path; estimates a tip pixel within the plurality of short paths based on the direction of the candidate arrow; determines, for the candidate arrow, a plurality of arrowhead edges in the plurality of short paths based on the tip pixel; generates, for the candidate arrow, a plurality of refined arrowhead edges based on the plurality of arrowhead edges, the direction, and the tip pixel; and matches properties of the plurality of refined arrowhead edges to an arrow description.

Other aspects of the invention will be apparent from the following description and the appended claims.

DETAILED DESCRIPTION

Figure 1:
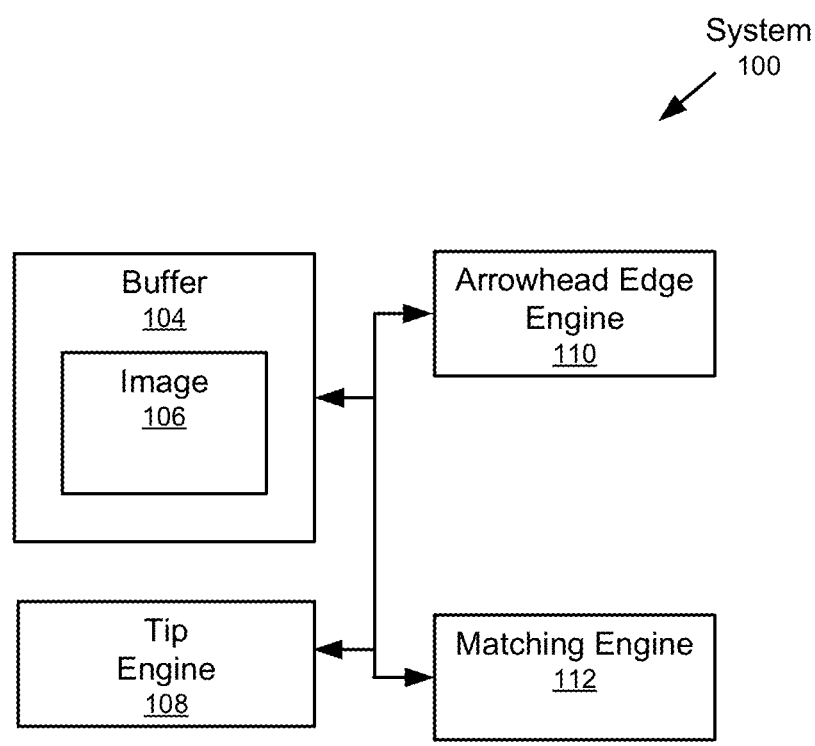
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing using a processor. An image including one or more hand-drawn arrows is obtained. A candidate arrow (i.e., possible arrow) is identified within the image by identifying one or more long paths (e.g., the arrow body) followed by a set of short paths (e.g., the arrowhead). Then, a tip pixel is estimated using the direction of the candidate arrow. Multiple arrowhead edges are initially determined starting from the estimated tip pixel and then refined based on a vector that is orthogonal, or approximately orthogonal, to the direction of the candidate arrow. The properties of the refined arrowhead edges may be compared with one or more arrow descriptions. If there is a match, the candidate arrow is deemed to be an arrow. Accordingly, when the image is converted into an editable format, the long paths and the short paths in the image corresponding to the candidate arrow are replaced with an arrow graphic.

FIG. 1 shows a system (100) in accordance with one or more embodiments of the invention. As shown in FIG. 1, the system (100) has multiple components including a buffer (104), a tip engine (108), an arrowhead engine (110), and a matching engine (112). Each of these components (104, 108, 110, 112) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (104). The buffer (104) may be implemented in hardware (i.e., circuitry), software, or any combination thereof. The buffer (104) stores an image (106) having one or more arrows. The arrows may be hand-drawn or machine printed. The image (106) may be a scan of a hardcopy document. The image (106) may be a digital photograph of a hardcopy document or whiteboard. Additionally or alternatively, the image (106) may be downloaded from any source (e.g., website). Further, the image (106) may be of any size and in any format (e.g., JPEG, GIF, BMP, etc.). In one or more embodiments of the invention, the image (106) is skeletonized (e.g., using the Medial Axis Transform).

Those skilled in the art, having the benefit of this detailed description, will appreciate that a hand-drawn arrow may appear within the image (106) as one or more long paths (i.e., the arrow body) followed by multiple short paths (i.e., the arrowhead). In other words, candidate arrows are identified by identifying one or more long paths in the image followed by multiple short paths. The long path adjacent to (e.g., closest to) the multiple short paths may be referred to as the terminal long path. If there is only one long path, it is the terminal long path.

In one or more embodiments of the invention, the system (100) includes the tip engine (108). The tip engine (118) may be implemented in hardware (i.e., circuitry), software, or any combination thereof. The tip engine (108) is configured to estimate the tip pixel of a candidate arrow. The tip pixel is the furthest-most pixel, within the arrowhead, in the direction of the arrow. In one or more embodiment, the tip engine (108) first determines a direction vector for the candidate arrow based on the endpoints of the terminal long path.

Let A be the vector from the origin to a starting endpoint of the terminal long path. Let B be the vector from the origin to a terminal endpoint (i.e., the endpoint closest to the multiple short paths) of the terminal long path. The direction vector D may be determined as D=B−A. D may be normalized such that it has a magnitude of 1.

In one or more embodiments of the invention, the tip engine (108) may generate a test vector T for each pixel within the multiple short paths. Each test vector T goes from the terminal endpoint of the terminal long path to one pixel within the multiple short paths.

In one or more embodiments of the invention, the tip engine (108) estimates the tip pixel by calculating the dot product of the direction vector D with each test vector T (i.e., D·T). Accordingly, multiple dot products are calculated (i.e., one dot product for each test vector). The pixel corresponding to the test vector that produced the largest positive dot product with the direction vector D is estimated to be the tip pixel.

In one or more embodiments of the invention, the system (100) includes the arrowhead engine (110). The arrowhead engine (110) may be implemented in hardware (i.e., circuitry), software, or any combination thereof. The arrowhead engine (110) is configured to determine the edges of the arrowhead. Specifically, the arrowhead engine (110) traces (e.g., using the Moore-Neighbor Tracing algorithm) edges in the short paths staring from the tip pixel. The traced edges are collections of pixels that form the contour (e.g., outer perimeter) of the arrowhead. There may be two edges, and thus two collections of pixels, that extend from the tip pixel. The tracing may continue until the body of the candidate arrow is reached. Additionally or alternatively, the tracing may continue until an extension of the body of the candidate arrow is reached (discussed below).

In one or more embodiments of the invention, the arrowhead engine (110) is configured to refine the arrowhead edges. The refinement process may include identifying an outer pixel for each arrowhead edge (i.e., collection of pixels), and then applying a contour smoothing operation to the arrowhead edge based on the outer pixel and the tip pixel.

In one or more embodiments, the arrowhead engine (110) calculates a normal vector N that is orthogonal (or approximately orthogonal) to the direction vector D. The arrowhead engine (110) also generates a test vector T for each pixel in the collection of pixels. Each test vector T goes from the terminal endpoint of the terminal long path to one pixel in a collection of pixels (i.e., an arrowhead edge).

In one or more embodiments, the arrowhead engine (110) identifies the outer pixel in a collection by calculating the dot product of the normal vector N with each test vector T (i.e., N·T). Accordingly, multiple dot products are calculated (i.e., one dot product for each test vector). The pixel in the collection corresponding to the test vector that produced the largest positive dot product with the normal vector N is identified as the outer pixel. This is repeated for each collection of pixels.

In one or more embodiments, the arrowhead engine (110) further refines an arrowhead edge (i.e., collection of traced pixels) by removing the pixels in the collection of pixels that are beyond the outer pixel. In one or more embodiments of the invention, the arrowhead engine (110) further refines an arrowhead edge by applying a contour smoothing operation to the collection of pixels. The contour smoothing operation may include generating a straight line between the outer pixel and the tip pixel. The contour smoothing operating may include fitting a curve to the remaining pixels in the collection of pixels and the tip pixel.

In one or more embodiments, the system (100) includes the matching engine (112). The matching engine (112) may be implemented in hardware (i.e., circuitry), software, or any combination thereof. The matching engine (112) is configured to compare the properties of the refined arrowhead edges, and possibly the body of the candidate arrow, with one or more arrow descriptions. These properties are used to distinguish between arrowhead and non-arrowhead shapes. The properties may include the lengths of each refined arrowhead edge, the angle between the two refined arrowhead edges, the angles between each refined arrowhead edge and the body of the candidate arrow, etc. If a match is found, the candidate arrow is deemed to be an actual arrow in the image (106). Accordingly, when the image (106) is converted into a editable format, the candidate arrow (e.g., hand-drawn arrow) may be replaced with an arrow graphic.

Those skilled in the art, having the benefit of this detailed description, will appreciate that the comparison/matching process may be fine-tuned empirically with respect to a collection of good and poor examples of candidate arrows. Further, this fine-tuning may be executed by hand or by machine learning to perform optimization.

Although FIG. 1 shows the system (100) as having four components (104, 108, 110, 112), in other embodiments, the system (100) may have more or fewer components. For example, the system (100) may include a converter engine (not shown) that converts the image (106) into an editable format. During this conversion process, the converter may replace hand-drawn arrows in the image (106) with an arrow graphic. As another example, the system (100) may include addition engines to perform additional processing (e.g., OCR) on the image (106) to extract text from the image (106). As yet another example, the system (100) may include a repository to store arrow descriptions.

Figure 2:
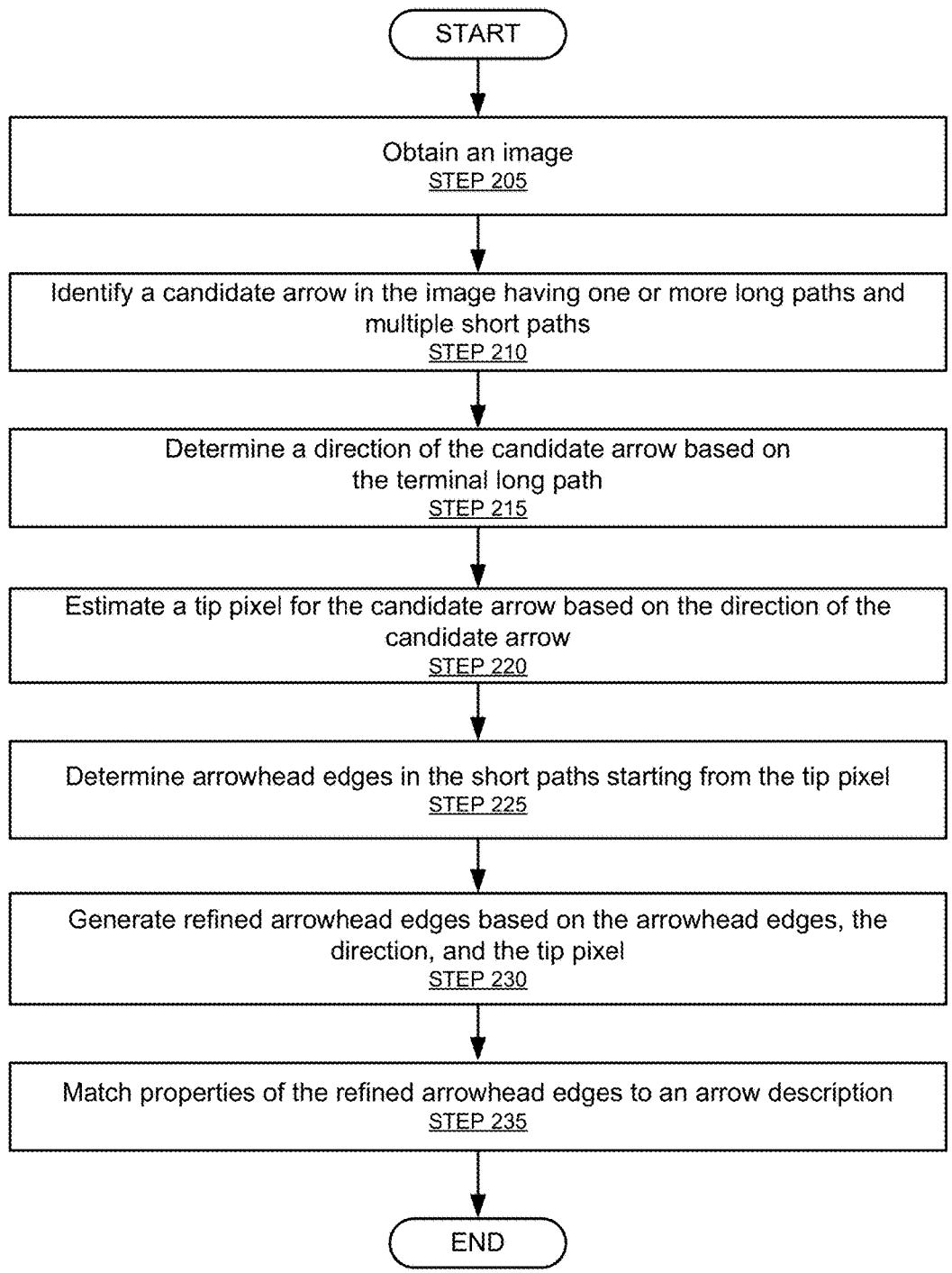
FIGS. 2-4 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (104, 108, 110, 112) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image is obtained (STEP 205). The image may be obtained from a digital camera or from a scanner. The image may be downloaded from a server. The image may include one or more arrows. Each arrow may be hand-drawn or machine printed. The image may be skeletonized (e.g., using the Medial Axis Transform).

In STEP 210, a candidate arrow is identified in the image. The candidate arrow may be identified by identifying one or more long paths (i.e., the body of the arrow) followed by multiple short paths (i.e. the arrowhead). The long path closest to the multiple short paths is referred to as the terminal long path. If there is only one long path, it is the terminal long path.

In STEP 215, a direction of the candidate arrow is determined. The direction is determined based on the terminal long path. Specifically, a direction vector is calculated based on the endpoints of the terminal long path. Let A be the vector from the origin to a starting endpoint of the terminal long path. Let B be the vector from the origin to a terminal endpoint (i.e., the endpoint closest to the multiple short paths) of the terminal long path. The direction vector D may be determined as D=B−A. D may be normalized such that it has a magnitude of 1.

In STEP 220, a tip pixel is estimated for the candidate arrow. The tip pixel is the furthest-most pixel, within the arrowhead, in the direction of the candidate arrow. Accordingly, the tip pixel is estimated based on the direction vector. The process for estimating the tip pixel is discussed below with respect to FIG. 3.

In STEP 225, arrowhead edges are determined. The arrowhead edges may be determined by tracing (e.g., using the Moore-Neighbor Tracing algorithm) edges in the short paths staring from the tip pixel. The traced edges are collections of pixels that form the contour (e.g., outer perimeter) of the arrowhead. There may be two edges, and thus two collections of pixels, that extend from the tip pixel. The tracing may continue until the body of the candidate arrow is reached. Additionally or alternatively, the tracing may continue until an extension of the body of the candidate arrow is reached.

In STEP 230, refined arrowhead edges are generated. As discussed above, each arrowhead edge is a collection of pixels. The refinement process may identify an outer pixel in each collection and apply a contour smoothing operation to each collection based on the outer pixel and the tip pixel. The process of refining the arrowhead edges is discussed below with respect to FIG. 4.

In STEP 235, the properties of the refined arrowhead edges, and possibly the body of the candidate arrow, are compared with one or more arrow descriptions. These properties are used to distinguish between arrowhead and non-arrowhead shapes. The properties may include the lengths of each refined arrowhead edge, the angle between the two refined arrowhead edges, the angles between each refined arrowhead edge and the body of the candidate arrow, etc. If a match is found, the candidate arrow is deemed to be an actual arrow in the image. Accordingly, when the image is converted into a editable format, the candidate arrow (e.g., hand-drawn arrow) may be replaced with an arrow graphic.

Figure 3:
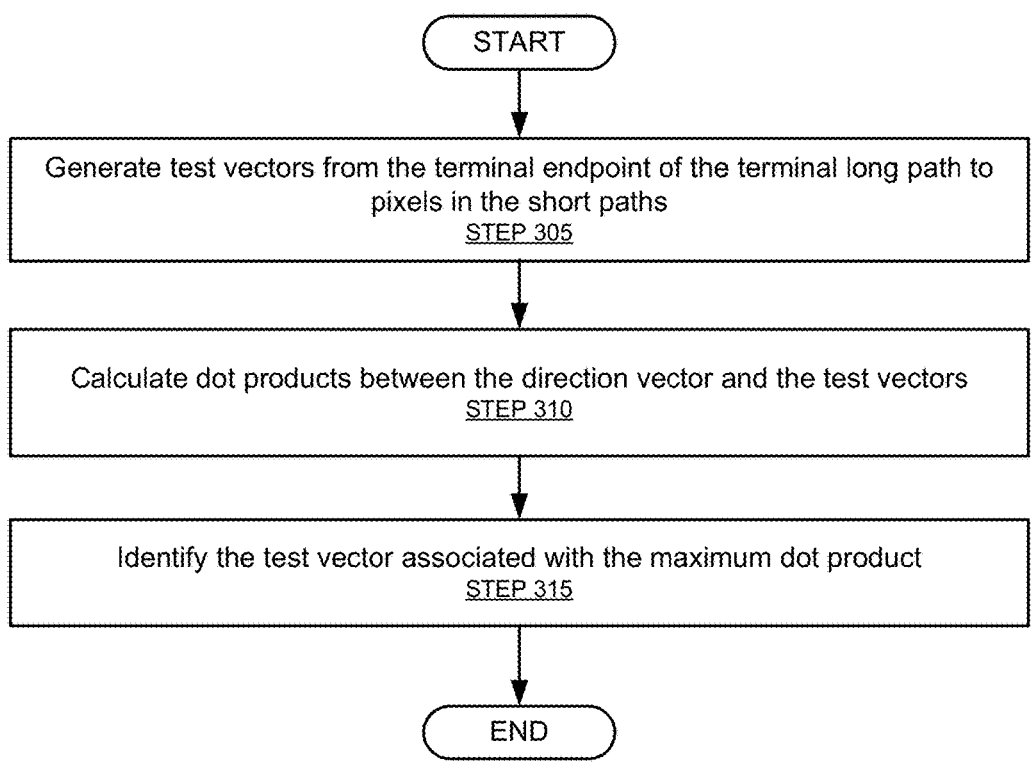

FIG. 3 shows a flowchart in accordance with one or more embodiments of the invention. The flowchart depicts a process for estimating a tip pixel. One or more of the steps in FIG. 3 may be performed by the tip engine (108), discussed above in reference to FIG. 1. Further, one or more of the steps in FIG. 3 may correspond to STEP 220 in FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, test vectors are generated for the pixels in the short paths (STEP 305) of the candidate arrow. Each test vector goes from the terminal endpoint of the terminal long path to one of the pixels in the short paths.

In STEP 310, dot products are calculated between the direction vector and each test vector. Accordingly, multiple dot products (i.e., one dot product for each pixel in the short paths) exist after STEP 310 is executed.

In STEP 315, the test vector that resulted in the maximum dot product (i.e., the largest positive dot product) is identified. The pixel corresponding to this test vector that resulted in the maximum dot product is deemed to be the tip pixel for the candidate arrow.

Figure 4:
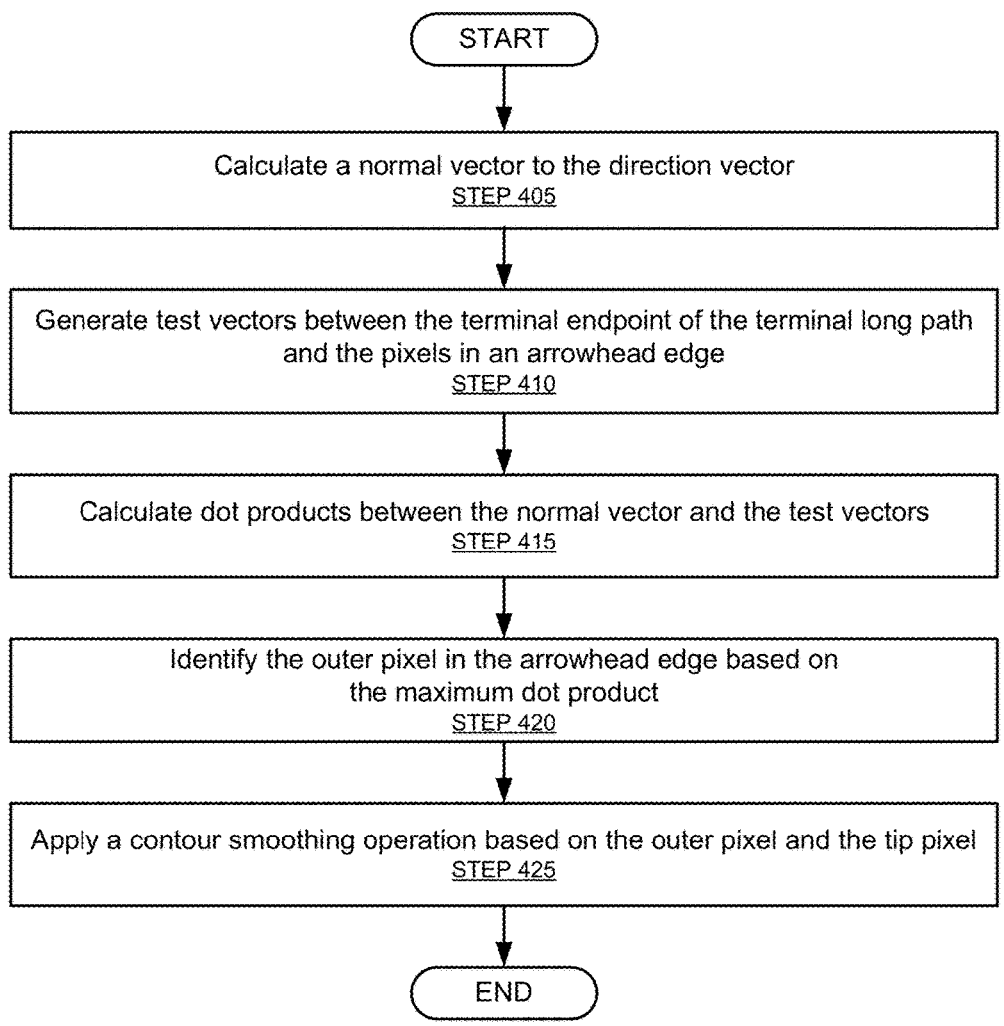

FIG. 4 shows a flowchart in accordance with one or more embodiments of the invention. The flowchart depicts a process for refining arrowhead edges. One or more of the steps in FIG. 4 may be performed by the arrowhead edge engine (110), discussed above in reference to FIG. 1. Further, one or more of the steps in FIG. 4 may correspond to STEP 230 in FIG. 2. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a normal vector is calculated (STEP 405). The normal vector is orthogonal or approximately orthogonal to the direction vector.

In STEP 410, multiple test vectors are generated for the pixels in an arrowhead edge. As discussed above, the arrowhead edge is a collection of pixels tracing an outer edge (e.g., perimeter) of the arrowhead. The arrowhead edge radiates from the tip pixel. Each test vector goes from the terminal endpoint of the terminal long path to one pixel in the arrowhead edge (i.e., collection of pixels).

In STEP 415, dot products are calculated between the normal vector and each test vector. Accordingly, multiple dot products (i.e., one dot product for each pixel in the arrowhead edge) exist after STEP 415 is executed.

In STEP 420, an outer pixel in the arrowhead edge is identified. Identifying the outer pixel includes identifying the test vector that resulted in the maximum dot product with the normal vector. The pixel corresponding to the test vector that resulted in the maximum dot product is designed the outer pixel. In one or more embodiments, all pixels in the collection beyond the outer pixel are removed from the collection.

In STEP 425, a contour smoothing operation is applied to the pixel. The contour smoothing operation may include generating a straight line between the outer pixel and the tip pixel. In other words, the refined arrowhead edge may be a straight line from the outer pixel to the tip pixel. Additionally or alternatively, a smooth curve from the outer pixel to the pixel tip may be fitted to the collection of pixels. In such embodiments, the refined arrowhead edge is the fitted smooth curve.

Those skilled in the art, having the benefit of this detailed description, will appreciate that the steps in FIG. 4 may be executed for each arrowhead edge (i.e., each collection of pixels). However, for the second arrowhead edge, STEP 415 uses the reverse normal vector instead of the normal vector. The reverse normal vector is the normal vector rotated by 180 degrees.

Figure 5A:
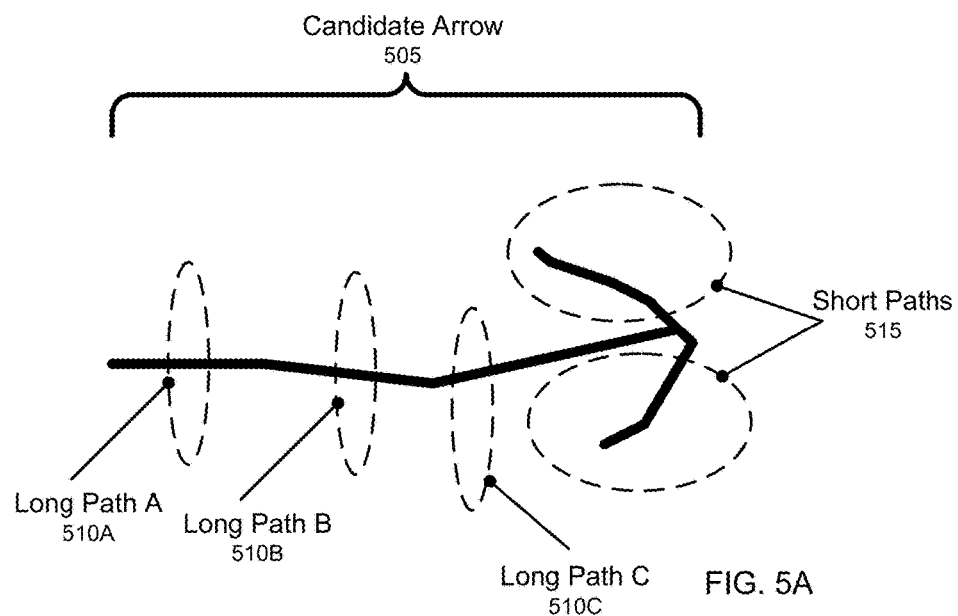
FIGS. 5A-5G show an implementation example in accordance with one or more embodiments of the invention.

FIGS. 5A-5F show an implementation example in accordance with one or more embodiments of the invention. As shown in FIG. 5A, there exists a candidate arrow (505). The candidate arrow (505) is hand-drawn. Moreover, the candidate arrow (505) is located in an image (not shown).

Still referring to FIG. 5A, the candidate arrow (505) is composed of multiple long paths (i.e., long path A (510A), long path B (510B), long path C (510C)) followed by multiple short paths (515). All the long paths (510A, 510B, 510C) and the short paths (515) are line segments. Moreover, all the long paths (510A, 510B, 510C) and the short paths (515) are composed of pixels. Long path C (510C) is the closest to the short paths (515). Accordingly, long path C (510C) is the terminal long path for the candidate arrow (505).

Figure 5B:
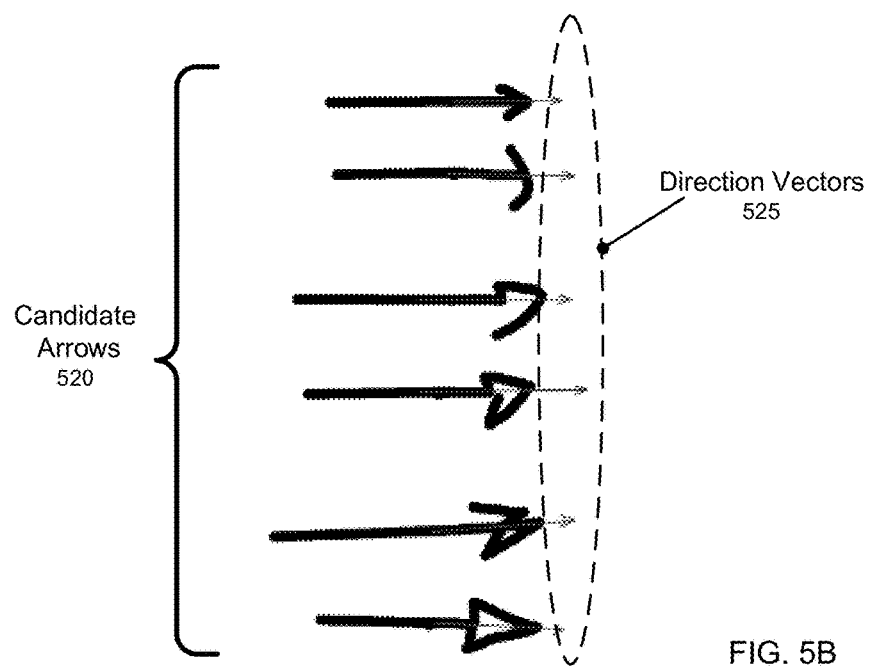

FIG. 5B shows multiple candidate arrows (520) and the direction vectors (525) for the multiple candidate arrows (520). As discussed above, the direction vector for each candidate arrow is generated based on the endpoints of the terminal long path (e.g., Long Path C (510C)) for the candidate arrow.

Figure 5C:
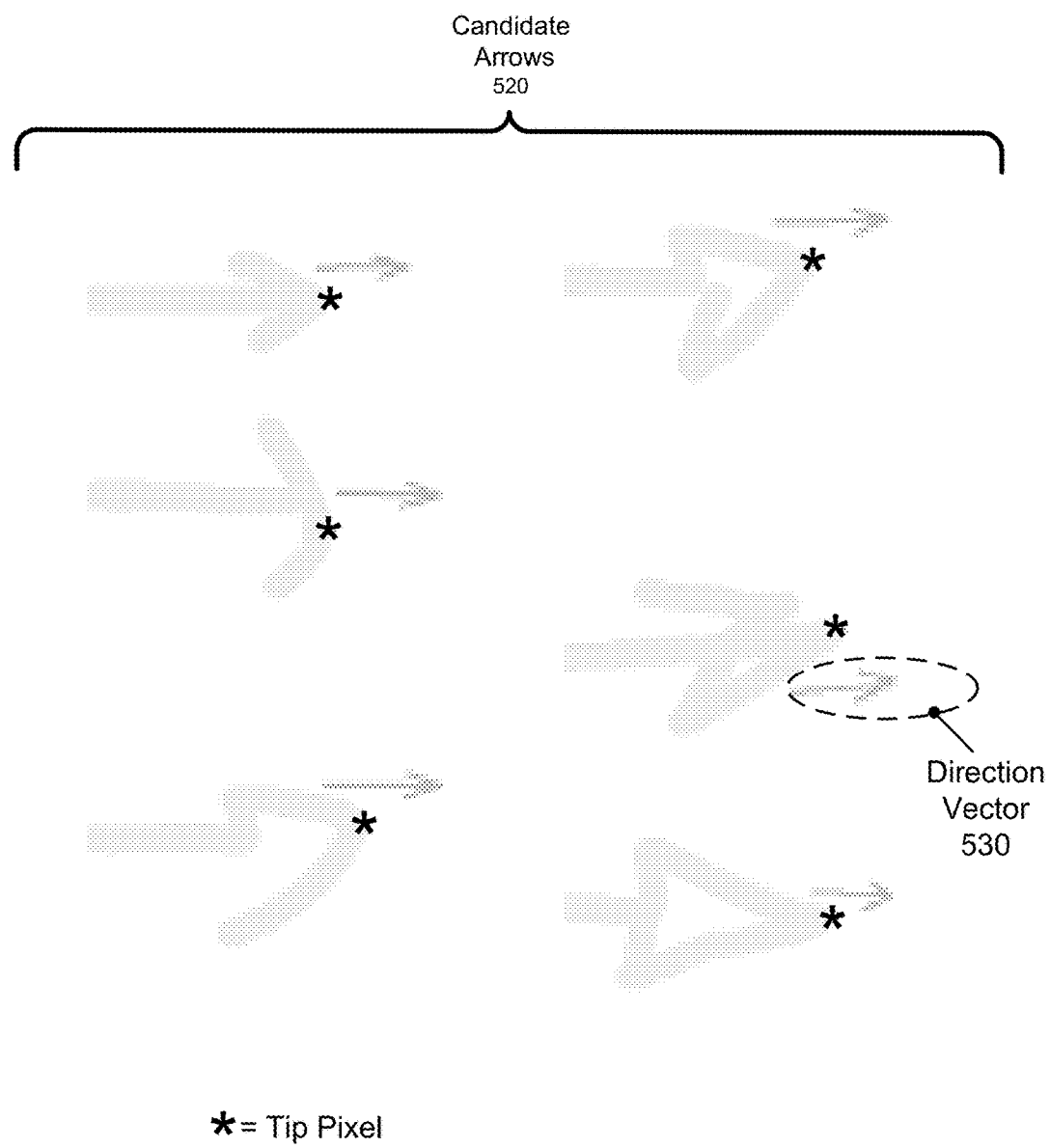

FIG. 5C shows multiple candidate arrows (520) and the estimated tip pixel for each candidate arrow. FIG. 5C also shows the direction vector (e.g., 530) of each candidate arrow.

Figure 5D:
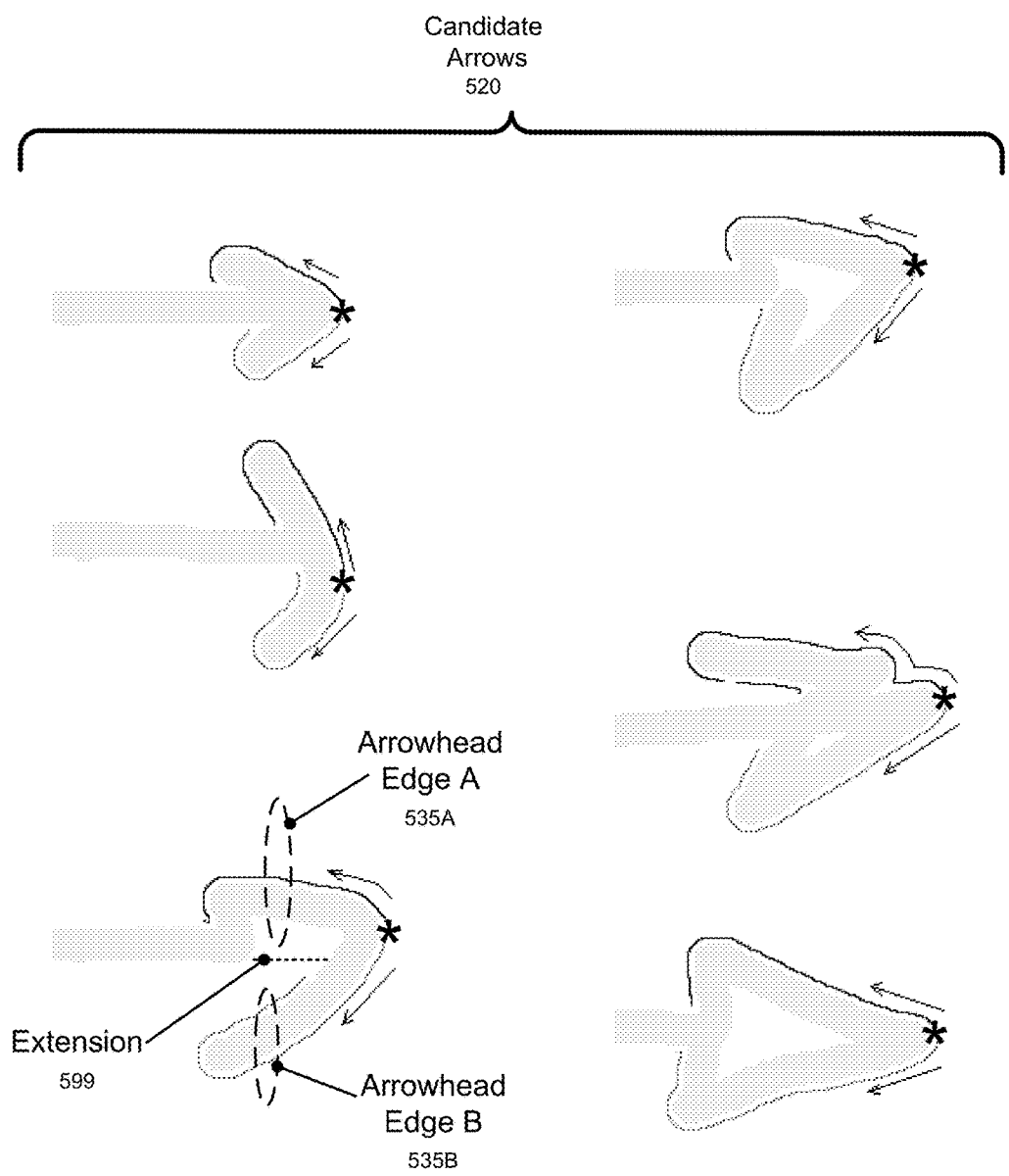

FIG. 5D shows multiple candidate arrows (520) and the arrowhead edges (e.g., Arrowhead Edge A (535A), Arrowhead Edge B (535B)) for each candidate arrow. As discussed above, each arrowhead edge is collection of pixels that traces the outer edge (i.e., perimeter) of the arrowhead. The tracing continues until the arrow body is reached (e.g., arrowhead edge A (535A)) or until an extension (e.g., extension (599)) of the arrow body is reached (e.g., arrowhead edge B (535B)).

Figure 5E:
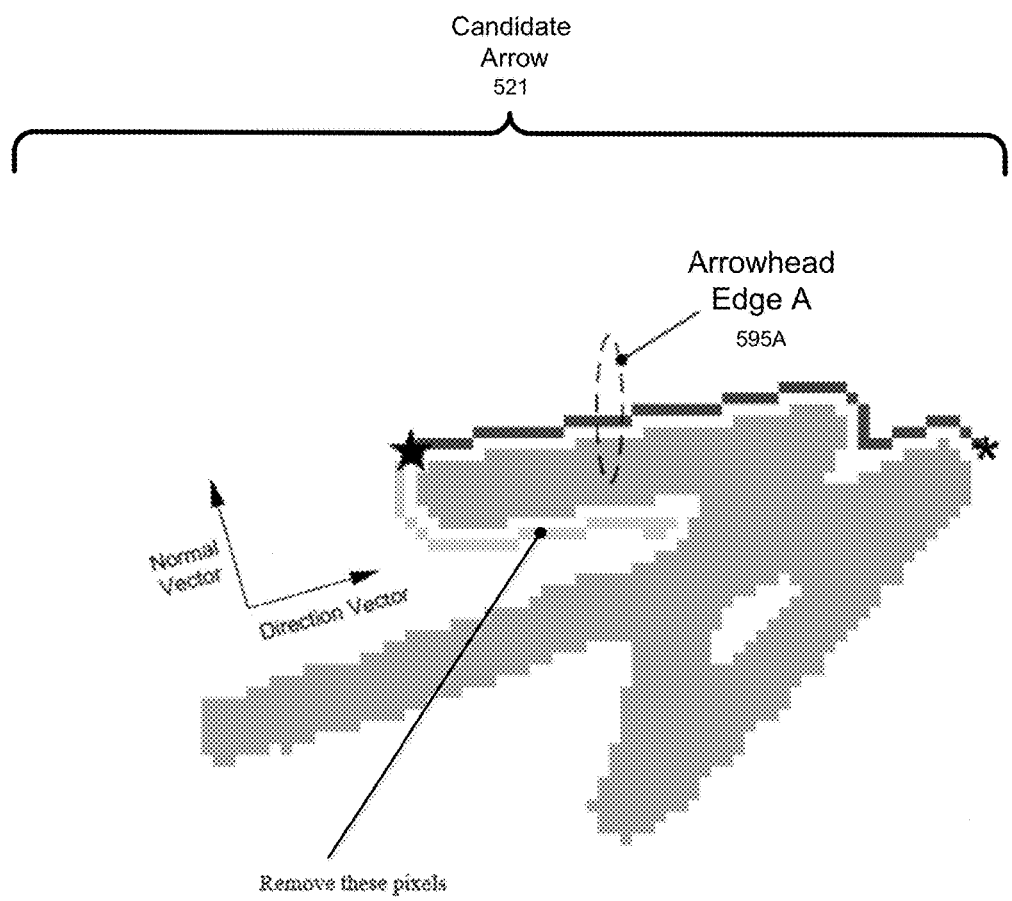

FIG. 5E shows a candidate arrow (521) having arrowhead edge A (595A) and an outer pixel for arrowhead edge A (595A). FIG. 5E also shows the direction vector and the normal vector for the candidate arrow (521). As discussed above, arrowhead edge A (595A) is a collection of pixels tracing the outer edge of the arrowhead. The tracing starts at the tip pixel and moves in one direction (e.g., left direction). As also discussed above, the outer pixel may be identified based on the normal vector. The pixels beyond the outer pixel may be removed from the collection.

Figure 5F:
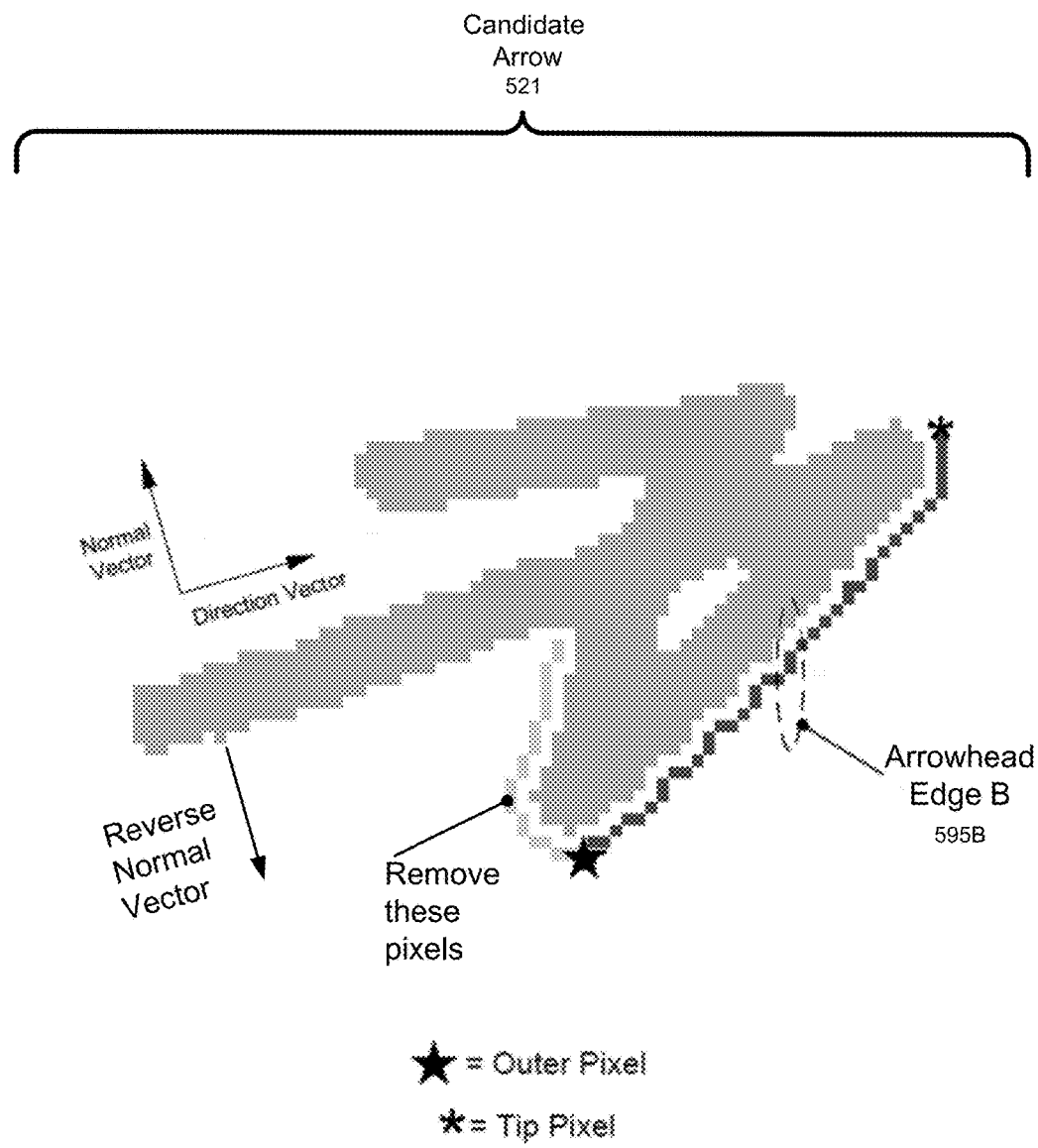

FIG. 5F shows another arrowhead edge (i.e., arrowhead edge B (595B)) and an outer pixel for arrowhead edge B (595B). FIG. 5F also shows the direction vector and the reverse normal vector for the candidate arrow (521). Like arrowhead edge A (595A), arrowhead edge B (595B) is a collection of pixels tracing the outer edge of the arrowhead. However, in the case of arrowhead B (595B), the tracing starts at the tip pixel and moves in a different direction (e.g., right direction). As also discussed above, the outer pixel may be identified based on the reverse normal vector. The pixels beyond the outer pixel may be removed from the collection.

Figure 5G:
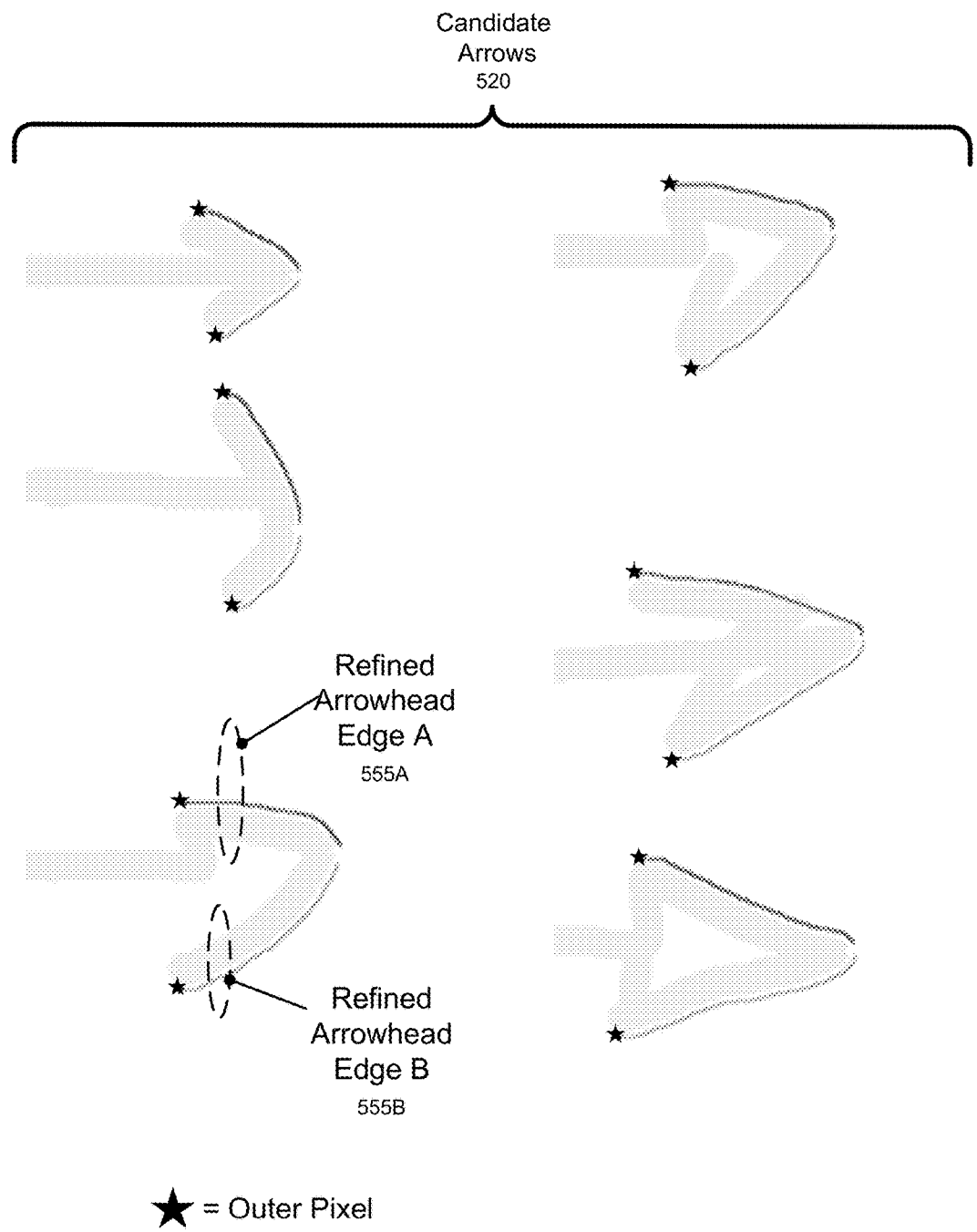

FIG. 5G shows multiple candidate arrows (520) and refined arrowhead edges (e.g., Refined Arrowhead Edge A (555A), Refined Arrowhead Edge B (555B)) for each of the candidate arrows (520). The refined arrowhead edges terminate at the outer pixels for each candidate arrow. Further, the refined arrowhead edges are curves fitted to the collection of pixels that define the arrowhead edges. These refined arrowhead edges may be compared with arrow descriptions in search of a match confirming that the candidate arrow is an arrow.

One or more embodiments of the invention may have the following advantages: the ability to identify a hand-drawn candidate arrow in an image; the ability to replace the candidate arrow with an arrow graphic when converting the image to a editable format; the ability to determine the direction of the candidate arrow; the ability to estimate the tip pixel of the candidate arrow; the ability to trace the outer edges of the arrowhead of the candidate arrow; the ability to identify outer pixels for the candidate arrows; the ability to refine the arrowhead edges by applying contour smoothing; the ability to characterize short paths as arrowheads by comparing the properties of the refined arrowhead edges with arrow descriptions; etc.

Figure 6:
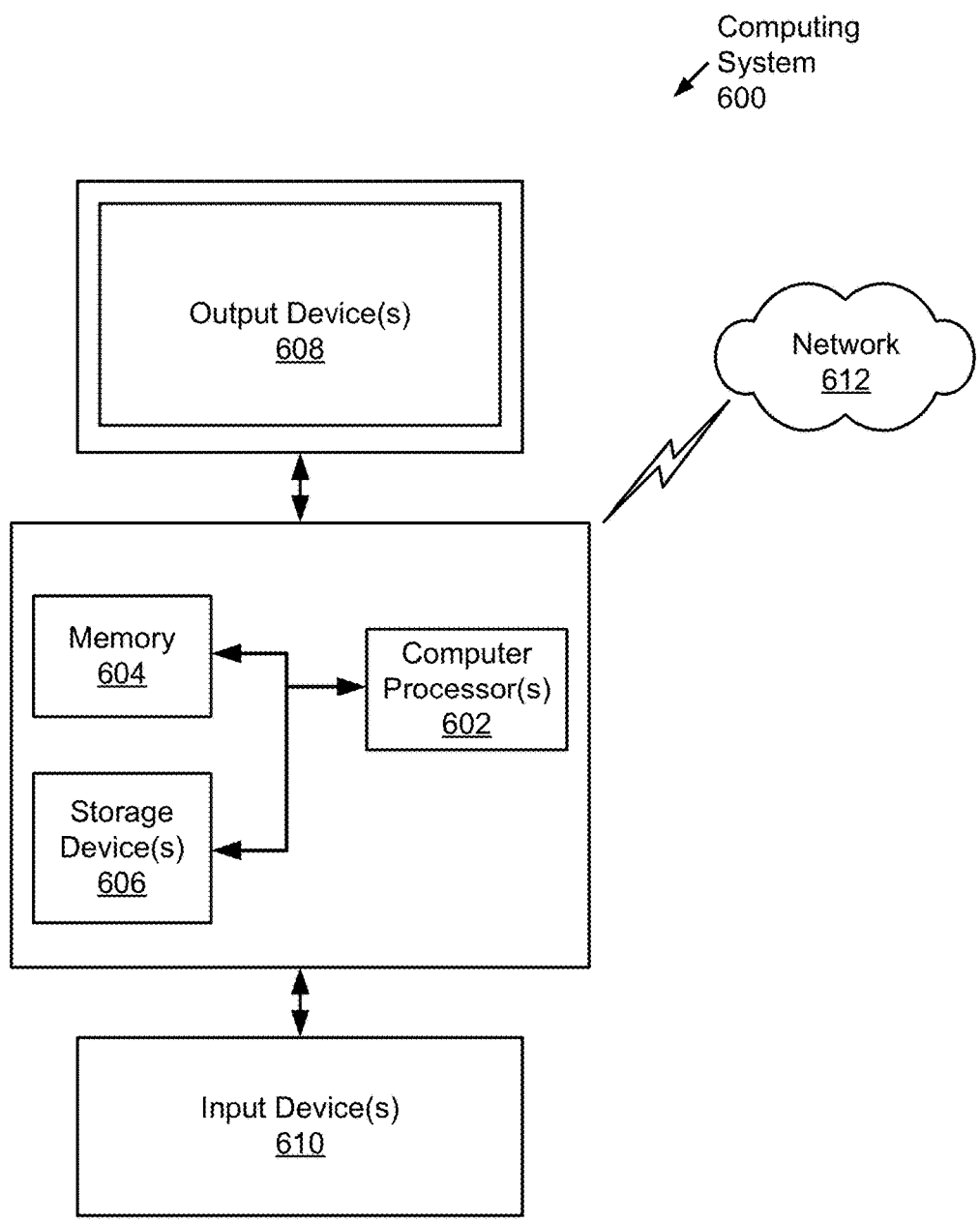
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image with a processor, comprising:
   identifying, within an image, a candidate arrow comprising a long path adjacent to a plurality of short paths;
   determining a direction of the candidate arrow based on the long path;
   estimating a tip pixel within the plurality of short paths based on the direction of the candidate arrow;
   determining, for the candidate arrow, a plurality of arrowhead edges in the plurality of short paths based on tracing edges in the short paths starting from the tip pixel;
   generating, for the candidate arrow, a plurality of refined arrowhead edges based on the plurality of arrowhead edges, the direction, and the tip pixel; and
   converting the image to an editable format image comprising the plurality of refined arrowhead edges.

2. The method of claim 1, wherein determining the direction of the candidate arrow comprises:
   calculating a direction vector based on a starting endpoint of the long path and a terminal endpoint of the long path.

3. The method of claim 2, wherein estimating the tip pixel comprises:
   generating a plurality of test vectors based on the terminal endpoint and a plurality of pixels within the plurality of short paths;
   calculating a plurality of dot products between the direction vector and the plurality of test vectors; and
   identifying a test vector associated with the maximum dot product of the plurality of dot products,
   wherein the tip pixel is the pixel of the plurality of pixels corresponding to the test vector associated with the maximum dot product.

4. The method of claim 2, wherein determining the plurality of arrowhead edges comprises:
   tracing, in a first direction, a first edge comprising a first subset of the plurality of pixels from the tip pixel; and
   tracing, in a second direction, a second edge comprising a second subset of the plurality of pixels from the tip pixel.

5. The method of claim 4, wherein generating the plurality of refined arrowhead edges comprises:
   calculating a normal vector to the direction vector;
   generating a first plurality of test vectors based on the terminal endpoint and the first subset of the plurality of pixels;
   calculating a first plurality of dot products between the normal vector and the first plurality of test vectors;
   identifying a first test vector associated with the maximum dot product of the first plurality of dot products; and
   determining a first outer pixel corresponding to the first test vector.

6. The method of claim 5, wherein generating the plurality of refined arrowhead edges further comprises:
   generating a second plurality of test vectors based on the terminal endpoint and the second subset of the plurality of pixels;
   calculating a second plurality of dot products between the reverse normal vector and the second plurality of test vectors;
   identifying a second test vector associated with the maximum dot product of the second plurality of dot products; and
   determining a second outer pixel corresponding to second test vector.

7. The method of claim 6, wherein generating the plurality of refined arrowhead edges further comprises:
   generating a first straight line between the first outer pixel and the tip pixel; and
   generating a second straight line between the second outer pixel and the tip pixel.

8. The method of claim 6, wherein generating the plurality of refined arrowhead edges further comprises:
   applying a smoothing function to the first subset of pixels between the first outer pixel and the tip pixel; and
   applying the smoothing function to the second subset of pixels between the second outer pixel and the tip pixel.

9. The method of claim 1, further comprising:
   matching properties of the plurality of refined arrowhead edges to an arrow description, wherein the candidate arrow is hand-drawn.

10. A non-transitory computer readable medium (CRM) storing computer readable program code executed by a processor that:
    identifies, within an image, a candidate arrow comprising a long path adjacent to a plurality of short paths;
    determines a direction of the candidate arrow based on the long paths;
    estimates a tip pixel within the plurality of short paths based on the direction of the candidate arrow;
    determines, for the candidate arrow, a plurality of arrowhead edges in the plurality of short paths based on tracing edges in the short paths from the tip pixel;
    generates, for the candidate arrow, a plurality of refined arrowhead edges based on the plurality of arrowhead edges, the direction, and the tip pixel; and
    converts the image to an editable format image comprising the plurality of refined arrowhead edges.

11. The non-transitory CRM of claim 10, wherein determining the direction of the candidate arrow comprises:
    calculating a direction vector based on a starting endpoint of the long path and a terminal endpoint of the long path.

12. The non-transitory CRM of claim 11, wherein estimating the tip pixel comprises:
    generating a plurality of test vectors based on the terminal endpoint and a plurality of pixels within the plurality of short paths;

calculating a plurality of dot products between the direction vector and the plurality of test vectors; and
identifying a test vector associated with the maximum dot product of the plurality of dot products,
wherein the tip pixel is the pixel of the plurality of pixels corresponding to the test vector associated with the maximum dot product.

13. The non-transitory CRM of claim 11, wherein determining the plurality of arrowhead edges comprises:
tracing, in a first direction, a first edge comprising a first subset of the plurality of pixels from the tip pixel; and
tracing, in a second direction, a second edge comprising a second subset of the plurality of pixels from the tip pixel.

14. The non-transitory CRM of claim 13, wherein generating the plurality of refined arrowhead edges comprises:
calculating a normal vector to the direction vector;
generating a first plurality of test vectors based on the terminal endpoint and the first subset of the plurality of pixels;
calculating a first plurality of dot products between the normal vector and the first plurality of test vectors;
identifying a first test vector associated with the maximum dot product of the first plurality of dot products;
determining a first outer pixel corresponding to the first test vector;
generating a second plurality of test vectors based on the terminal endpoint and the second subset of the plurality of pixels;
calculating a second plurality of dot products between the reverse normal vector and the second plurality of test vectors;
identifying a second test vector associated with the maximum dot product of the second plurality of dot products; and
determining a second outer pixel corresponding to the second test vector.

15. The non-transitory CRM of claim 14, wherein generating the plurality of refined arrowhead edges further comprises:
generating a first straight line between the first outer pixel and the tip pixel; and
generating a second straight line between the second outer pixel and the tip pixel.

16. An image processing apparatus, comprising:
a memory; and
a processor that:
identifies, within an image, a candidate arrow comprising a long path adjacent to a plurality of short paths;
determines a direction of the candidate arrow based on the long path;
estimates a tip pixel within the plurality of short paths based on the direction of the candidate arrow;
determines, for the candidate arrow, a plurality of arrowhead edges in the plurality of short paths based on tracing edges in the short paths starting from the tip pixel;
generates, for the candidate arrow, a plurality of refined arrowhead edges based on the plurality of arrowhead edges, the direction, and the tip pixel;
matches properties of the plurality of refined arrowhead edges to an arrow description; and
converts the image to an editable format image comprising the plurality of refined arrowhead edges.

17. The image processing apparatus of claim 16, wherein determining the direction of the candidate arrow comprises:
calculating a direction vector based on a starting endpoint of the long path and a terminal endpoint of the long path.

18. The image processing apparatus of claim 17, wherein estimating the tip pixel comprises:
generating a plurality of test vectors based on the terminal endpoint and a plurality of pixels within the plurality of short paths;
calculating a plurality of dot products between the direction vector and the plurality of test vectors; and
identifying a test vector associated with the maximum dot product of the plurality of dot products,
wherein the tip pixel is the pixel of the plurality of pixels corresponding to the test vector associated with the maximum dot product.

19. The image processing apparatus of claim 17, wherein determining the plurality of arrowhead edges comprises:
tracing, in a first direction, a first edge comprising a first subset of the plurality of pixels from the tip pixel; and
tracing, in a second direction, a second edge comprising a second subset of the plurality of pixels from the tip pixel.

20. The image processing apparatus of claim 19, wherein generating the plurality of refined arrowhead edges comprises:
calculating a normal vector to the direction vector;
generating a first plurality of test vectors based on the terminal endpoint and the first subset of the plurality of pixels;
calculating a first plurality of dot products between the normal vector and the first plurality of test vectors;
identifying a first test vector associated with the maximum dot product of the first plurality of dot products;
determining a first outer pixel corresponding to the first test vector;
generating a second plurality of test vectors based on the terminal endpoint and the second subset of the plurality of pixels;
calculating a second plurality of dot products between the reverse normal vector and the second plurality of test vectors;
identifying a second test vector associated with the maximum dot product of the second plurality of dot products; and
determining a second outer pixel corresponding to the second test vector.

* * * * *